United States Patent [19]

Hockney

[11] Patent Number: 5,337,997

[45] Date of Patent: Aug. 16, 1994

[54] EXTRUDED ALUMINUM SPRING HANGER

[75] Inventor: Philip K. Hockney, Smithfield, Australia

[73] Assignee: Hockney Pty Ltd., Australia

[21] Appl. No.: 988,980

[22] Filed: Dec. 11, 1992

[30] Foreign Application Priority Data

Dec. 16, 1991 [AU] Australia .................. PL0033

[51] Int. Cl.$^5$ .................................................. F16M 13/00
[52] U.S. Cl. ...................................... 248/596; 267/270; 280/718
[58] Field of Search ................ 267/270, 263, 269; 280/711, 715, 718; 248/596, 590

[56] References Cited

U.S. PATENT DOCUMENTS

| Re. 17,136 | 11/1928 | Harris | 267/269 |
|---|---|---|---|
| 1,449,927 | 3/1923 | Adams | 267/263 X |
| 1,607,205 | 11/1926 | Lord | 267/270 |
| 1,704,834 | 3/1929 | Jansson | 267/270 |
| 2,843,395 | 7/1958 | Brumbaugh | 267/270 X |
| 3,434,707 | 3/1969 | Raidel | 267/270 X |
| 3,493,222 | 2/1970 | Mathers | 267/270 |
| 4,109,979 | 8/1978 | Estaque | 267/269 X |
| 4,125,276 | 11/1978 | Levasseur | 267/270 X |
| 4,166,640 | 9/1979 | Denberg | 280/711 |
| 5,007,660 | 4/1991 | Orndorff | 280/715 |

FOREIGN PATENT DOCUMENTS 1530967  6/1979  Fed. Rep. of Germany ...... 267/270

Primary Examiner—J. Franklin Foss
Attorney, Agent, or Firm—Henry T. Burke

[57] ABSTRACT

A motor lorry spring hanger assembly (10) including a pair of generally parallel, co-extensive vertically oriented cheek plates (11). The cheek plates (11) have upper flanges (12, 13) through which bolts pass to secure the assembly to the main frame of the motor lorry. The cheek plates (11) are maintained in a generally parallel spaced relationship by means of a spacer box (16). The lower portions of the cheek plates (11) are provided with apertures (22) through which a spring bolt (21) passes. There is also provided bushing (23) engaging the cheek plates (11) and through which the bolt (21) passes.

4 Claims, 2 Drawing Sheets

EXTRUDED ALUMINUM SPRING HANGER

FIELD OF THE INVENTION

The present invention pertains to a spring hanger for a truck and more particularly to an extruded aluminium spring hanger.

BACKGROUND OF THE INVENTION

The springs which support the carriage of a truck are attached to spring hangers which are suspended from the carriage. Spring hangers of the prior art were steel and included various weldments in their construction. Normally, the prior art spring hangers were welded to the undercarriage of the truck as well. Under the loading conditions imposed, inadequate weldments had a tendency to fail, particularly in critical stress areas. Once damaged, the spring hangers of the prior art were difficult to repair.

OBJECTS AND SUMMARY OF THE INVENTION

It is an object of the invention to provide a spring hanger which substantially ameliorates the disadvantages of the prior art steel Spring hanger.

There is disclosed herein a motor lorry spring hanger assembly comprising:

a pair of extruded aluminium cheek plates, each plate having a top flange through which fasteners pass to secure the plates to a main frame of the lorry, said plates being adapted to be secured so as to be generally parallel, co-extensive and vertically oriented, each plate further having a spring bolt aperture, which apertures are horizontally aligned transverse of the plates;

spacer means between the plates aiding to maintain said relationship;

bushing means extending between the plates and having a spring bolt passage longitudinally aligned with said apertures; and a spring bolt passing through said apertures and passage for securing a spring to the spring hanger.

Accordingly, there is provided a spring hanger comprising two extruded aluminium cheek plates. The cheek plates are preferably formed from the same extrusion but arranged in a mirror image fashion. The cheek plates are separated by a spacer and clamped together with conventional bolts. Each of the cheek plates has an upper flange through which bolts may be passed to affix the spring hanger to a trailer underframe. A lower portion of the spring hanger transversely supports a spring eye bolt. In a preferred embodiment, a two part steel bushings is provided in each of the two through holes in the lower part of the spring hanger through which the transverse spring eye bolt passes.

BEST MODE AND OTHER EMBODIMENTS OF THE PRESENT INVENTION

Figure 1:
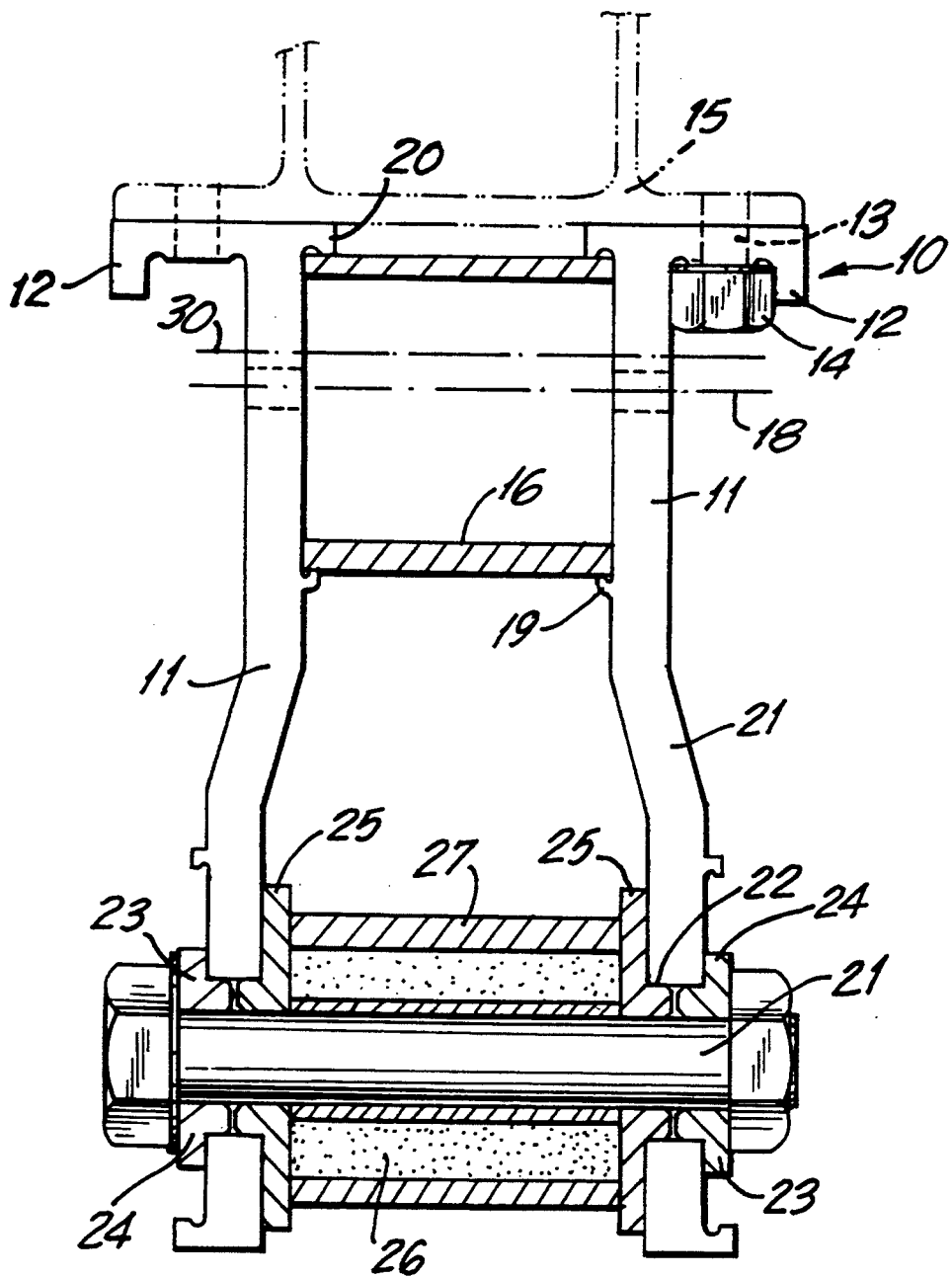
FIG. 1 is a cross-sectional view of a spring hanger according to the present invention.

As shown in FIG. 1, a spring hanger 10 of the present invention comprises two extruded aluminium cheek plates 11 having upper flanges 12. The upper flanges 12 are equipped with bolt holes 13 through which bolts 14 are inserted for attaching the spring hanger 10 to a trailer underframe 15. By using bolts 14 a weldment between the spring hanger and the trailer underframe is eliminated.

Figure 2:
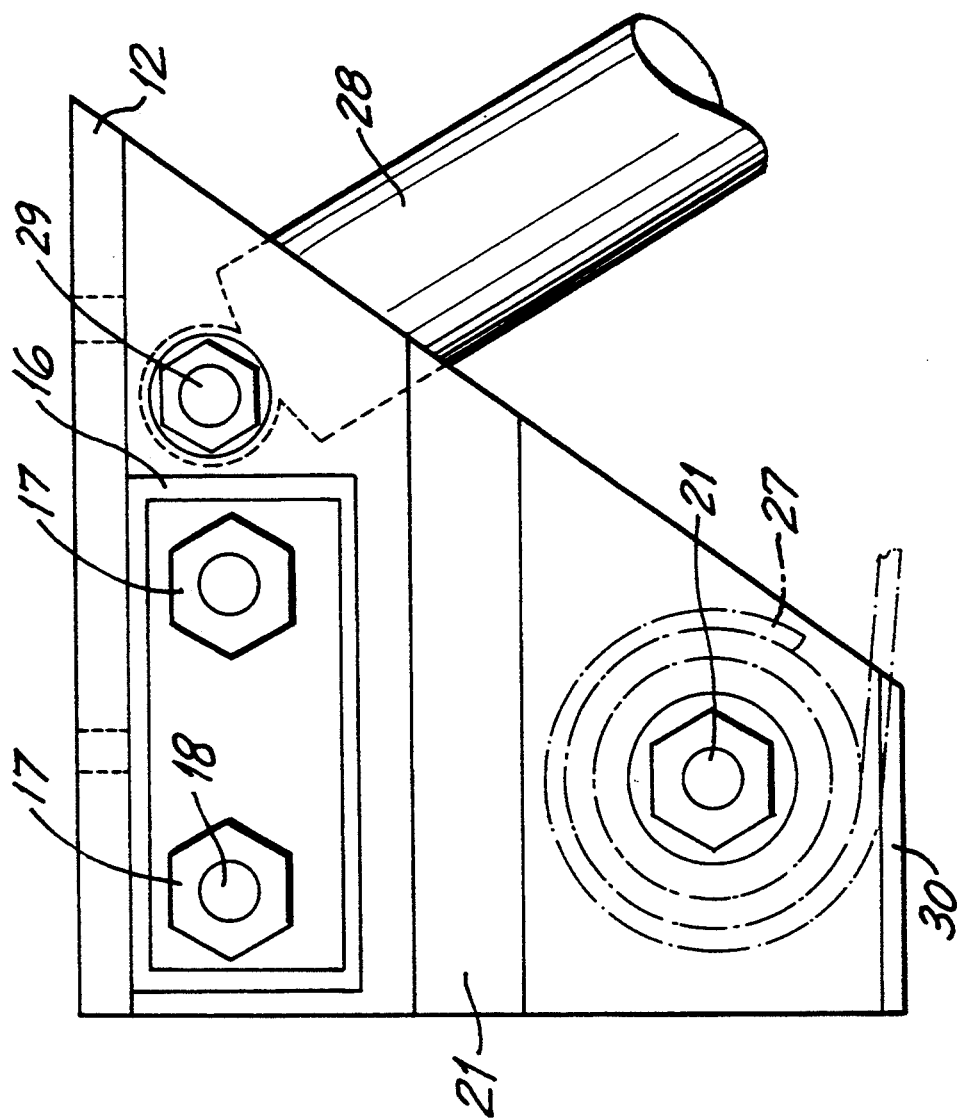
FIG. 2 is a side elevation of the spring hanger depicted in FIG. 1.

The cheek plates 11 are separated by one or more spacers or, as shown in FIGS. 1 and 2, a steel or extruded aluminium spacer box 16. The cheek plates 11 are clamped together by one or more bolts 17.

As shown more clearly in FIG. 2, where a spacer box 16 is used, the centre lines 18 of the bolts 17 preferably pass within the confines of the spacer box 16.

The spacers or spacer box 16 may be further located and integrated into the structure of the assembled spring hanger by the provision of a mounting lip 19, integrally formed with an Interior surface of the cheek plate 11 and by a second mounting lip or ridge 20 which may be formed as part of the upper flange 12.

The cheek plates 11 may be provided with a slight or gradual step 21 so that the spring hanger, when assembled gets wider toward the spring supporting bolt 21.

The spring supporting bolt or spring eye bolt passes through openings 22 formed in the lower portion of each cheek plate 11. A bushing 23 may be employed to further strengthen the opening 22 and help support the bolt 21. In the embodiment depicted in FIG. 1, a two-part bushing having a flange 24, 25 on each side is depicted.

A rubber bushing 26 is preferably used to support the leaf spring 27 about the spring eye or spring supporting bolt 21.

As shown in FIG. 2, a shock absorber 28 is supported between the cheek plates 11 by a bolt 29 which passes through a centre line 30 which may lie above the centre line 18 of the clamping bolts 17. As can be seen in the side elevation of FIG. 2, in profile, the spring hanger may be tapered from a maximum width at the top flange to a minimum width along the bottom edge 30.

While the present invention has been described with reference to particular details of construction, these should be understood as having been provided by way of example and not as limitations to the scope or spirit of the invention.

What I claim is:

1. A motor lorry spring hanger assembly comprising:

a pair of extruded aluminium cheek plates, each plate having a top flange through which fasteners pass to secure the plates to a main frame of the lorry, said plates being adapted to be secured so as to be generally parallel, co-extensive and vertically oriented, each plate further having a spring bolt aperture, which apertures are horizontally aligned transverse of the plates;

spacer means between the plates aiding to maintain said relationship;

bushing means extending between the plates and having a spring bolt passage longitudinally aligned with said apertures; and a spring bolt passing through said apertures and passage for securing a spring to the spring hanger.

2. The spring hanger assembly of claim 1, wherein each plate includes a generally vertically extending lower portion terminating at an upper end with the associated flange, and wherein said plates diverge downwardly at their lower portions.

3. The spring hanger assembly of claim 1 or 2, wherein each plate is provided with an abutment, which abutments engage said spacer means to provide as a locating means therefor.

4. The spring hanger assembly of claim 1 or 2, wherein each plate is provided with an abutment, which abutments engage said spacer means to provide as a locating means therefor, said abutment means being located intermediate the height of each plate, and each flange includes further abutment means positioned also to engage said spacer means.

* * * * *